United States Patent
Wagner et al.

(10) Patent No.: US 7,815,389 B2
(45) Date of Patent: *Oct. 19, 2010

(54) HAND RAIL SYSTEM RAILING CONNECTOR

(75) Inventors: Robert Wagner, Mequon, WI (US); Alan Nash, Franklin, WI (US)

(73) Assignee: R&B Wagner, Inc., Butler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/402,320

(22) Filed: Mar. 11, 2009

(65) Prior Publication Data

US 2009/0173852 A1    Jul. 9, 2009

Related U.S. Application Data

(63) Continuation-in-part of application No. 11/365,958, filed on Mar. 1, 2006, now Pat. No. 7,618,210.

(51) Int. Cl.
*B65G 21/20* (2006.01)
(52) U.S. Cl. ....................... 403/306; 403/397
(58) Field of Classification Search ............ 403/294, 403/297, 303, 306, 397
See application file for complete search history.

(56) References Cited

U.S. PATENT DOCUMENTS

| 4,249,830 | A | * | 2/1981 | Day ........................ 403/297 |
| 5,275,074 | A | * | 1/1994 | Taylor et al. ............ 403/297 |
| 5,662,427 | A | * | 9/1997 | Chen ........................ 403/363 |

* cited by examiner

*Primary Examiner*—Victor MacArthur
(74) *Attorney, Agent, or Firm*—Nicholas A. Kees; Godfrey & Kahn, S.C.

(57) ABSTRACT

A rail system includes a cap rail defining a slot. Within the slot may be positioned expansion brackets that permit the cap rail to be mounted to a wall or a post. The expansion bracket is configured to engage an end of a fixture to position and secure the fixture within the slot. The expansion bracket defines a cable way for wires extending to or from the fixture. Other expansion brackets may be mounted within the slot to position and secure ends of fixtures when the mounting expansion brackets are not correctly positioned with respect to the end of the fixture. A rail system includes a pair of rails extending between a pair of posts. An in-fill panel is positioned within slots of each rail and extends between the rails. Expansion brackets within the slots engage the panel.

14 Claims, 12 Drawing Sheets

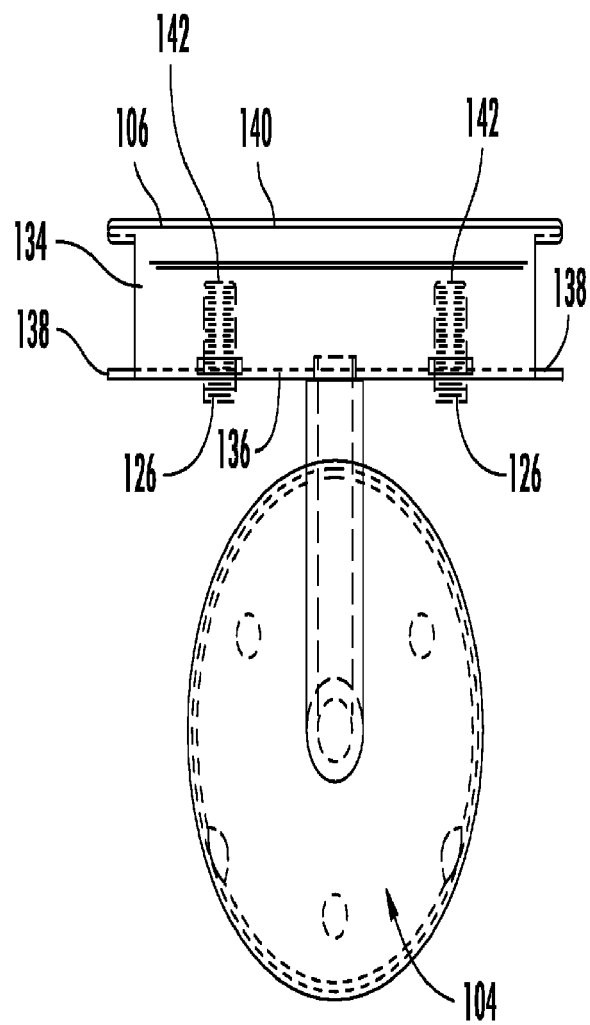
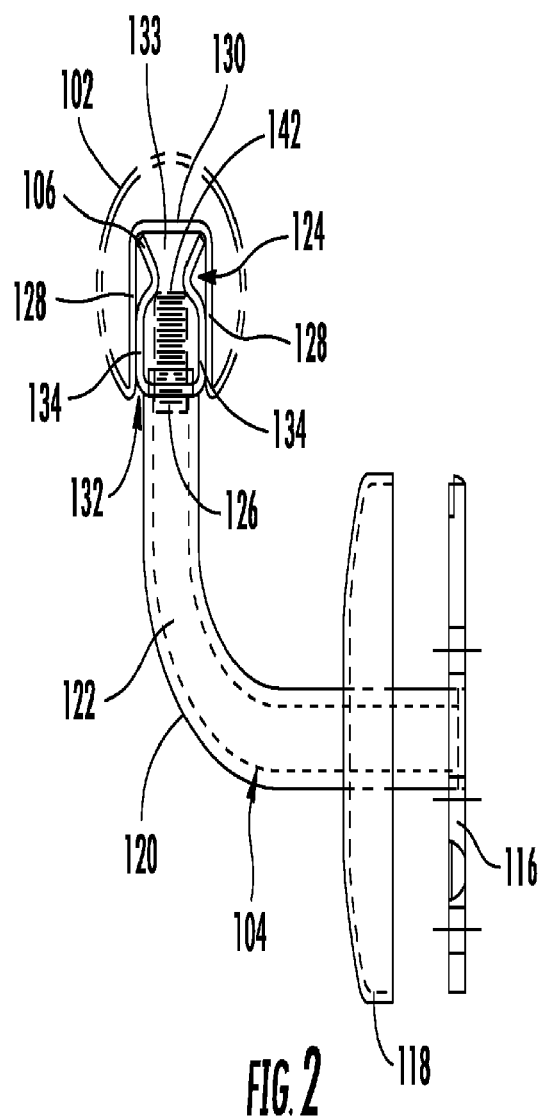
FIG. 3
FIG. 2

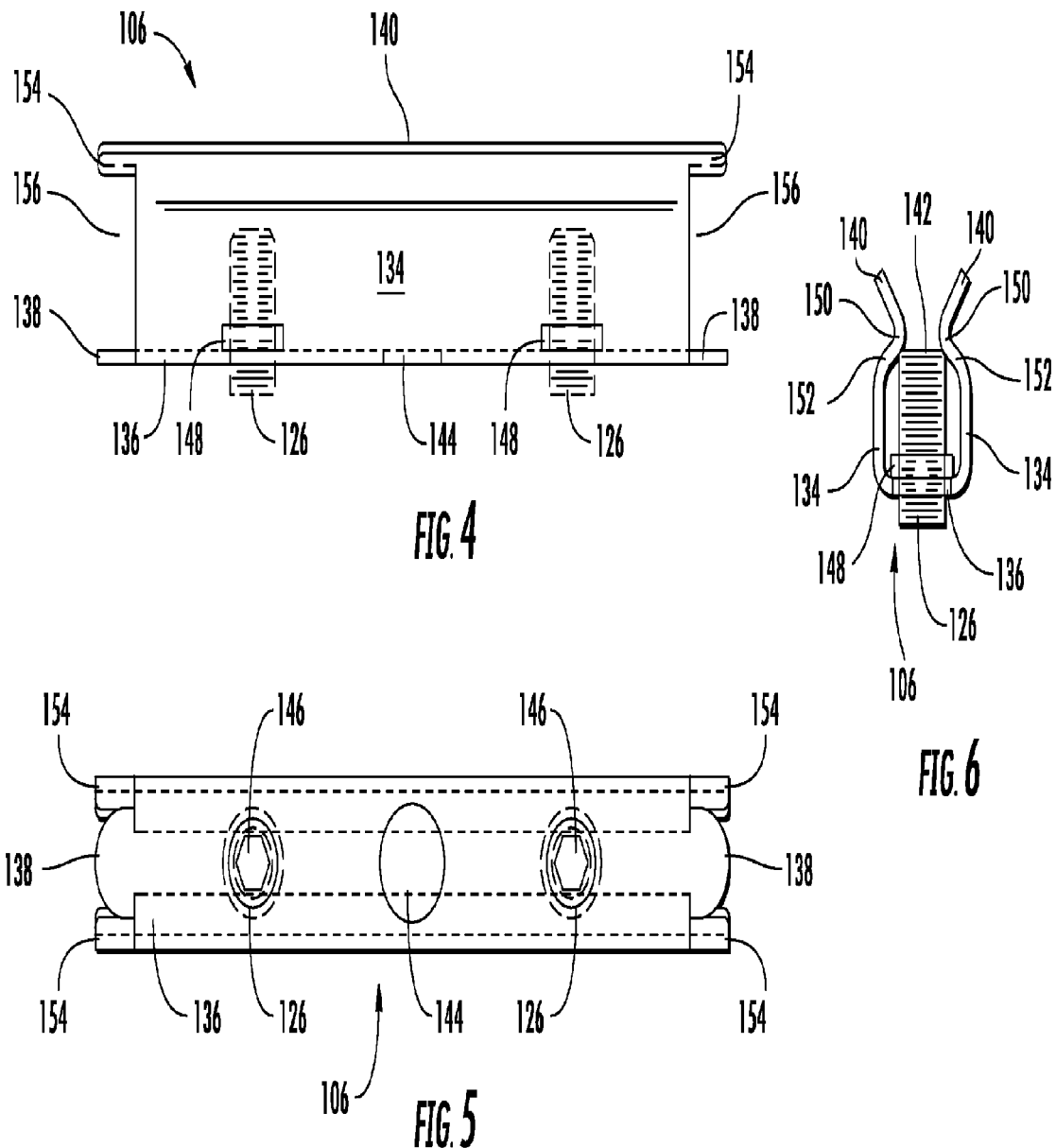

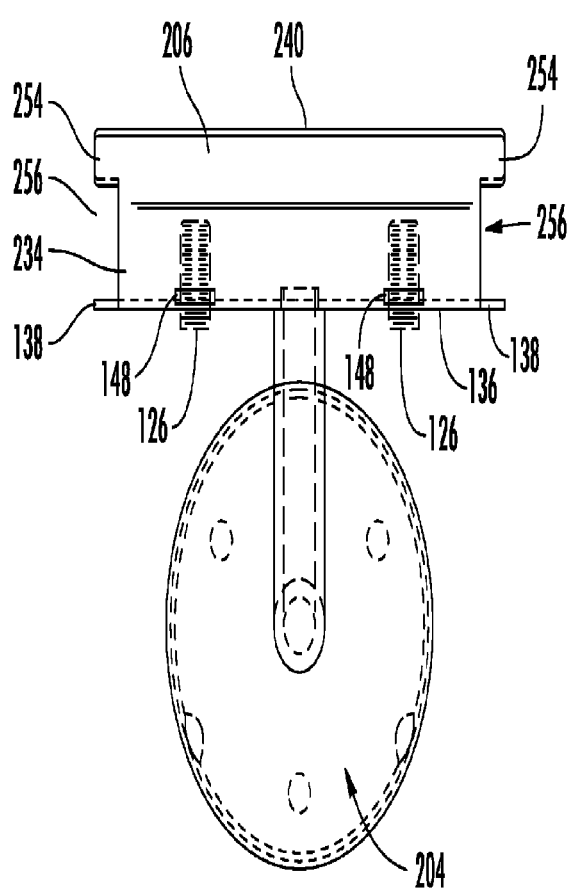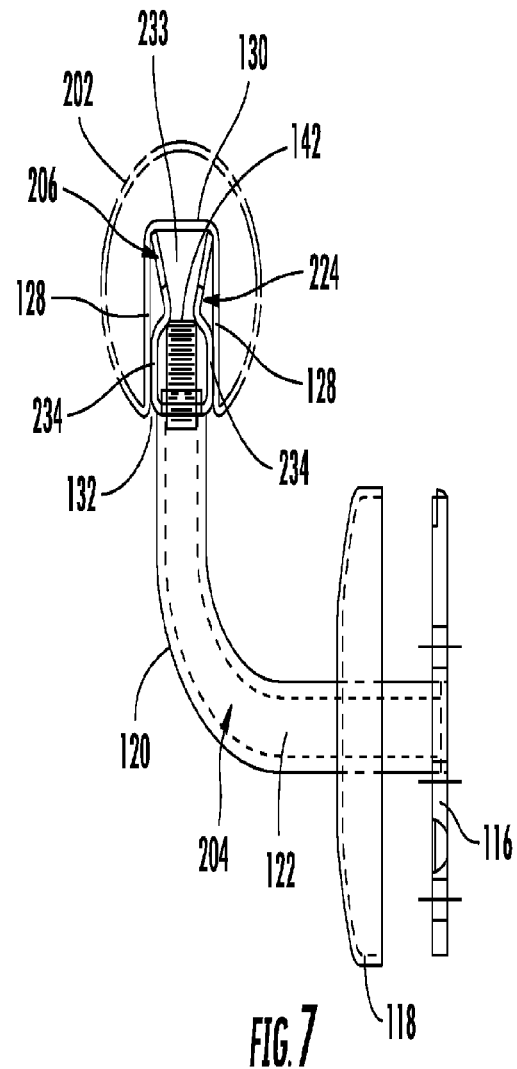
FIG. 8
FIG. 7

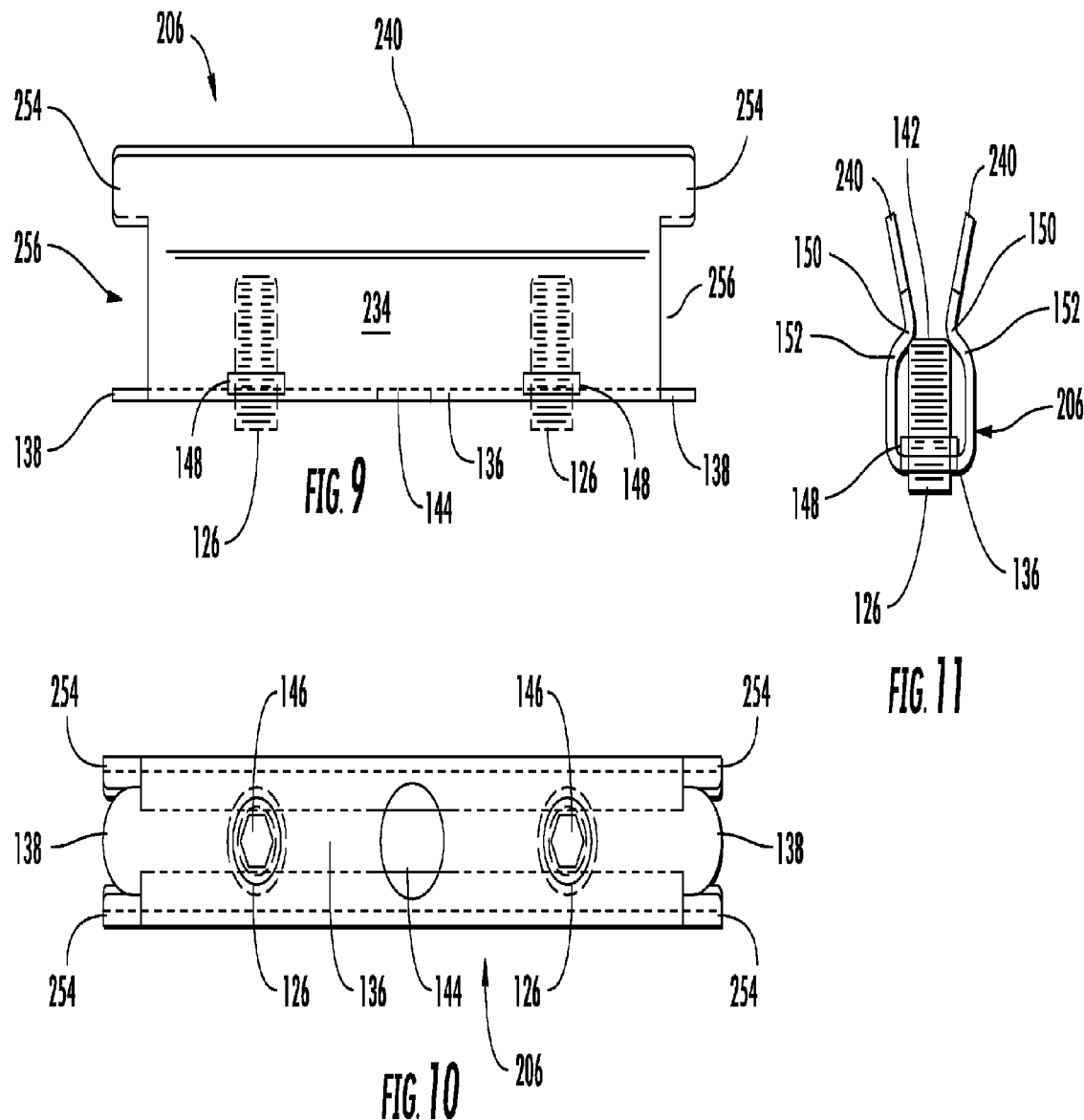

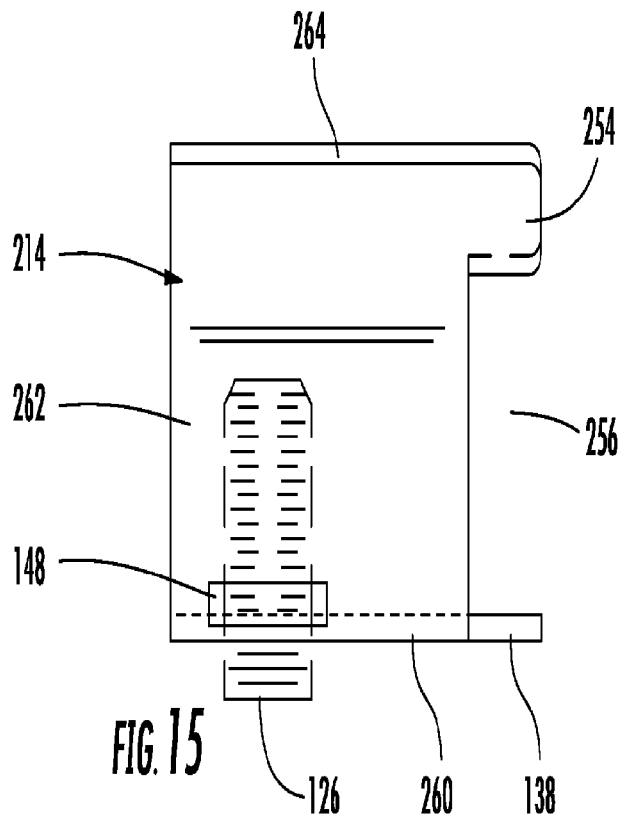
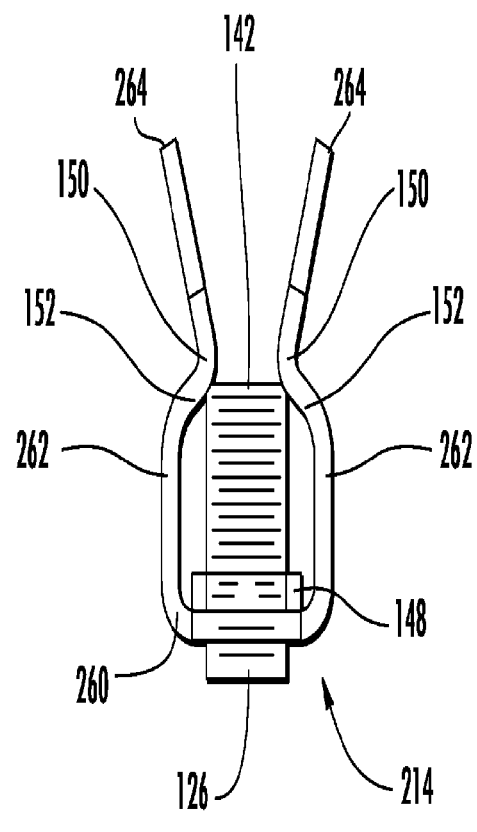
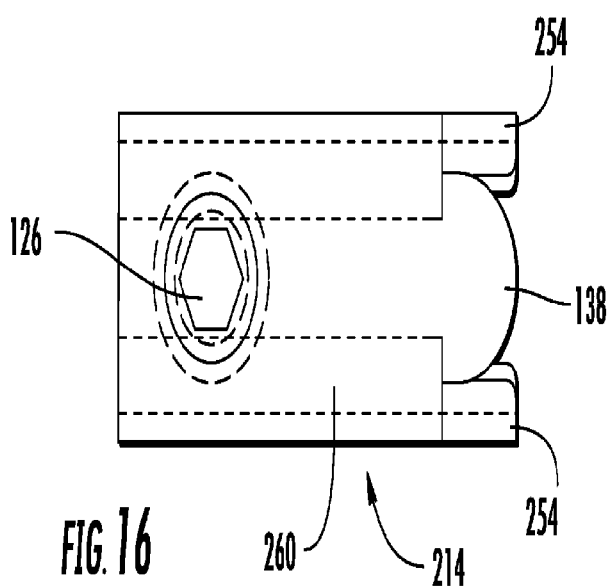

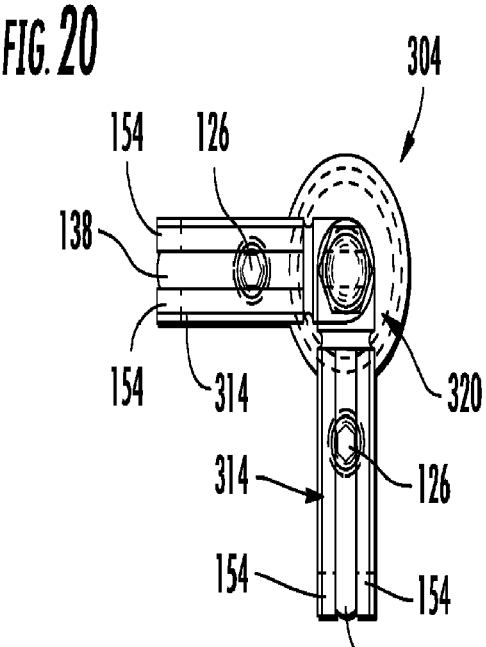
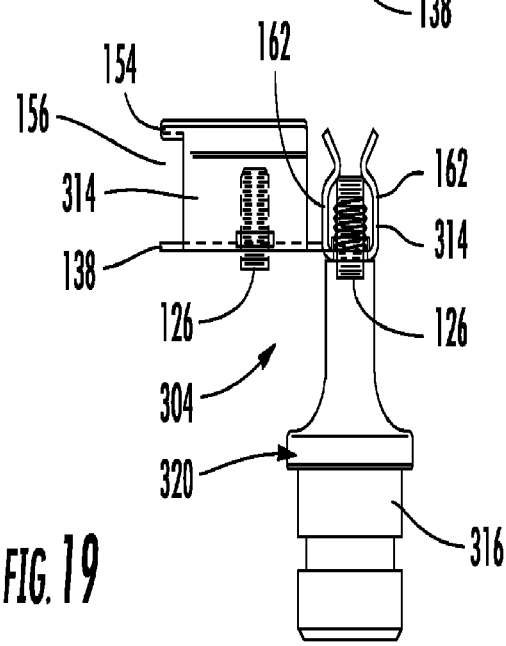
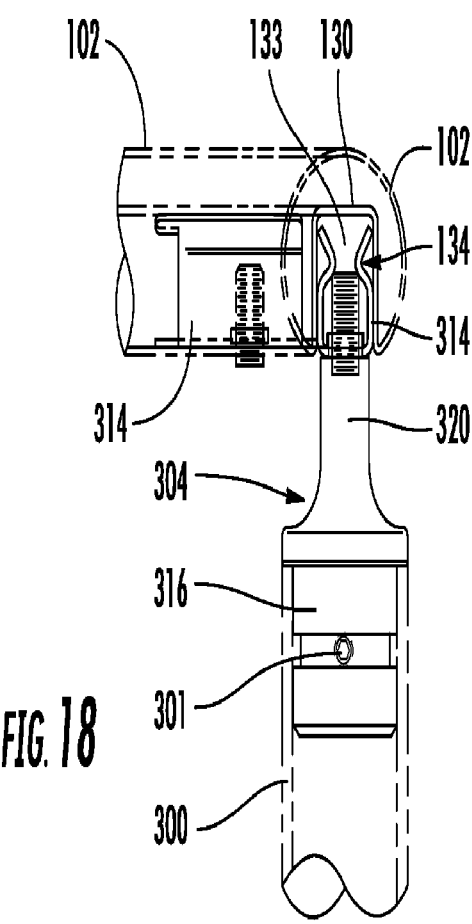

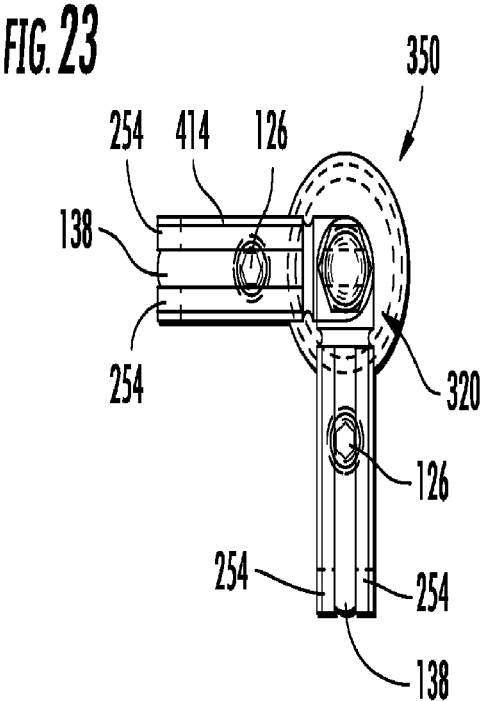
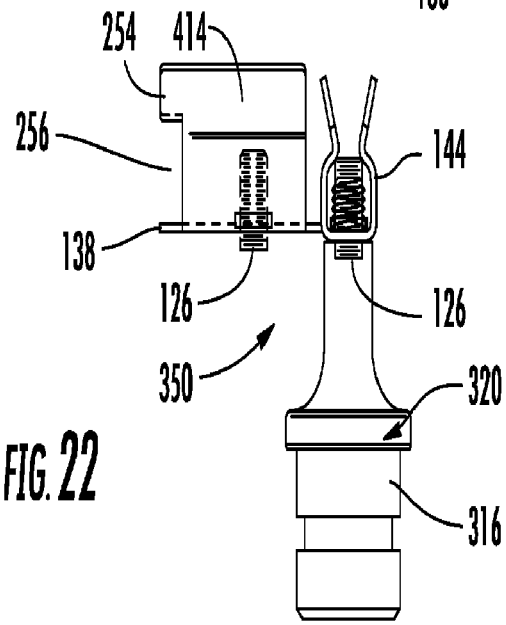
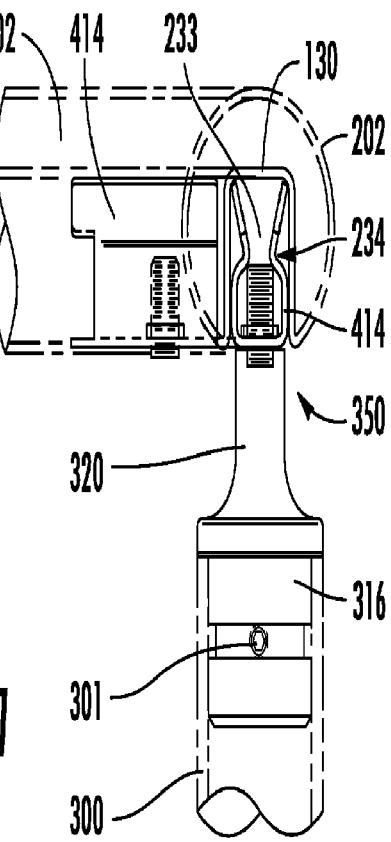

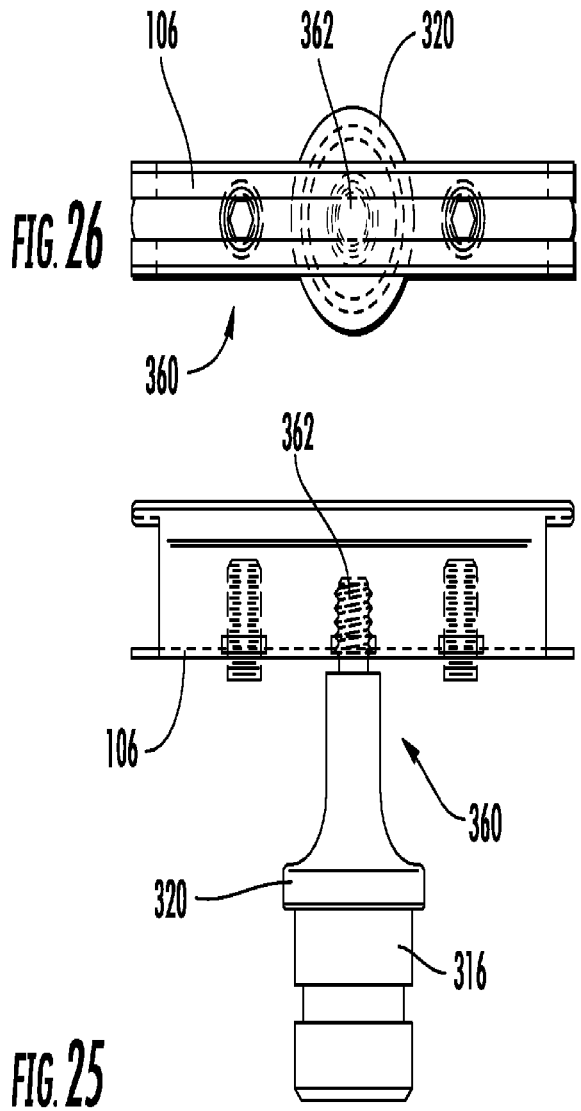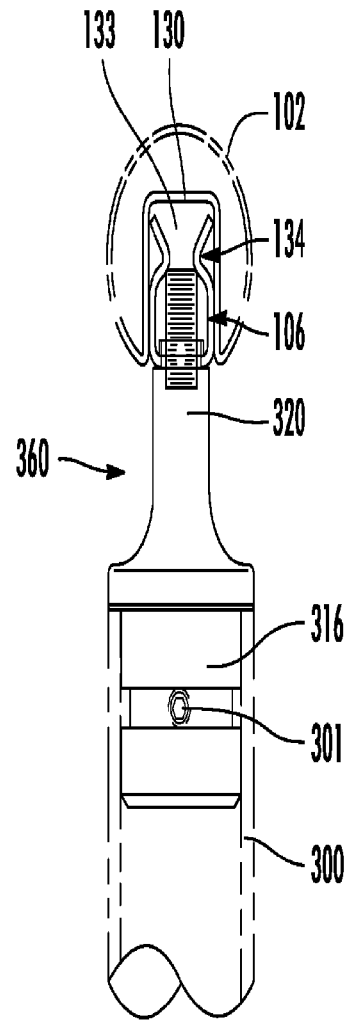

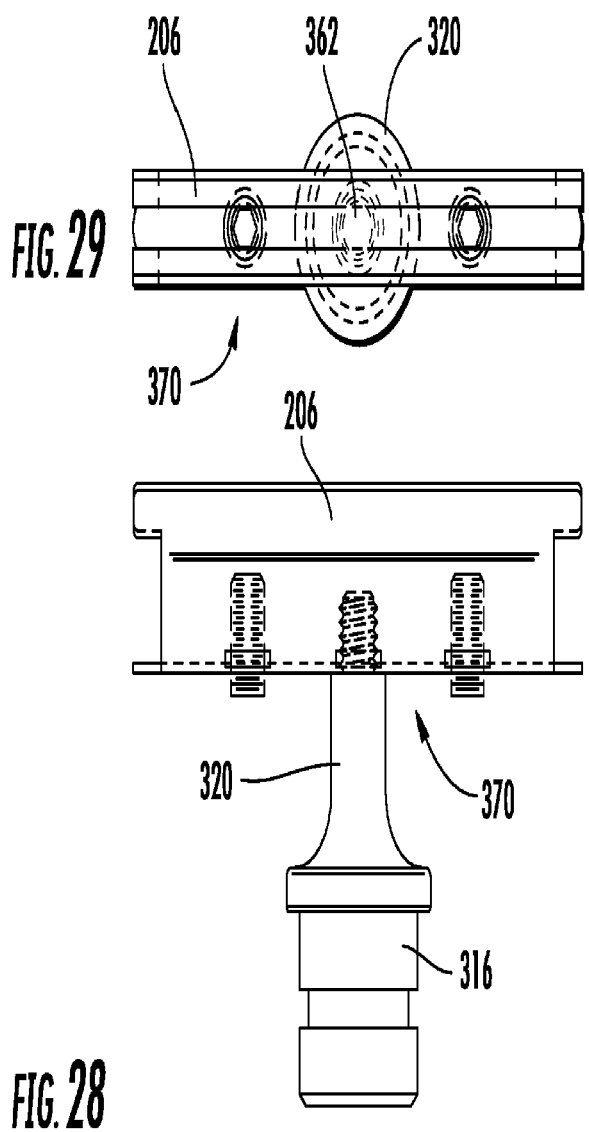
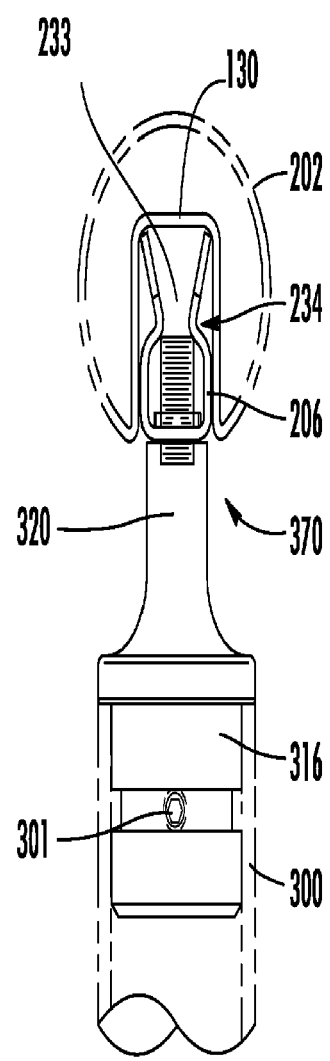

HAND RAIL SYSTEM RAILING CONNECTOR

CROSS-REFERENCE TO RELATED APPLICATIONS

The present application is a continuation-in-part of commonly-owned U.S. patent application Ser. No. 11/365,958, filed on Mar. 1, 2006 now U.S. Pat. No. 7,618,210, the disclosure of which is incorporated herein by reference, and a continuation of commonly-owned U.S. patent application Ser. No. 11/733,443, filed on Apr. 10, 2007, the disclosure of which is incorporated herein by reference.

TECHNICAL FIELD

The present disclosure relates generally to modular hand rail systems and accessories for such systems.

BACKGROUND

With conventional hand rail systems and designs, it is common for the customer to have to special order the particular size and length required. The components would then be made to order and shipped to the building site where an installer would be required to complete the installation. Conventional installations might also call for welding or other specialized techniques that might not be normally possible for the average consumer.

In different installations, it may be desirable to have illumination provided for the walkway, stairs, or other passage in which the railing is installed. Conventional lighting solutions such as in-wall lighting installations may not be practical for a particular application. This may be particularly true where lighting is being retrofitted into an existing space and it is not desirable to run electrical service through the wall to the location to be lit or there is no nearby wall conveniently located through which to run electrical service.

Improvements to conventional hand rail or railing systems are desirable to provide easier installation and configuration, and also to aid installation of lighting in conjunction with the hand rail or railing system.

SUMMARY

The present invention relates generally to a railing system. More specifically, the present invention relates to a railing system with a cap rail defining a slot underneath. Within the slot may be positioned expansion brackets that permit the cap rail to be mounted to a wall or a post. The expansion bracket is configured to engage an end of a light fixture to position and secure the light fixture within the slot. The expansion bracket defines a cable way for wires extending to or from the light fixture. Other expansion brackets may be mounted within the slot to position and secure ends of light fixtures when the mounting expansion brackets are not correctly positioned with respect to the end of the light fixture.

The present invention further relates to a method of assembling a rail system including light fixtures, mounting expansion brackets and other expansion brackets within a slot of a cap rail.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows:

FIG. 2 is an end view of a wall mount bracket assembly according to the present disclosure with a rail section mounted to the bracket assembly shown in dashed lines.

FIG. 3 is a side view of the wall mount bracket assembly of FIG. 2.

FIG. 4 is a side view of an expansion bracket of the wall mount bracket assembly of FIG. 3.

FIG. 5 is a top view of the expansion bracket of FIG. 4.

FIG. 6 is an end view of the expansion bracket of FIG. 4.

FIG. 7 is an end view of a second embodiment of a wall mount bracket assembly according to the present disclosure with a rail section mounted to the bracket assembly shown in dashed lines.

FIG. 8 is a side view of the wall mount bracket assembly of FIG. 7.

FIG. 9 is a side view of an expansion bracket of the wall mount bracket assembly of FIG. 8.

FIG. 10 is a top view of the expansion bracket of FIG. 9.

FIG. 11 is an end view of the expansion bracket of FIG. 9.

FIG. 15 is a side view of a second embodiment of a mounting clip according to the present disclosure.

FIG. 16 is a bottom view of the mounting clip of FIG. 15.

FIG. 17 is an end view of the mounting clip of FIG. 15.

FIG. 18 is an end view of a post mount bracket assembly according to the present disclosure, with a pair of expansion brackets and with rail sections mounted to the brackets and a post shown in dashed lines.

FIG. 19 is an end view of the post mount bracket assembly of FIG. 18.

FIG. 20 is a top view of the post mount bracket assembly of FIG. 19.

FIG. 21 is an end view of an alternative embodiment of a post mount bracket assembly according to the present disclosure, with a pair of expansion brackets and with rail sections mounted to the brackets and a post shown in dashed lines.

FIG. 22 is an end view of the post mount bracket assembly of FIG. 21.

FIG. 23 is a top view of the post mount bracket assembly of FIG. 22.

FIG. 24 is an end view of a post mount bracket assembly according to the present disclosure, with a rail section mounted to the bracket assembly and a post shown in dashed lines.

FIG. 25 is a side view of the post mount bracket assembly of FIG. 24.

FIG. 26 is a top view of the post mount bracket assembly of FIG. 25.

FIG. 27 is an end view of an alternative embodiment of a post mount bracket assembly according to the present disclosure, with a rail section mounted to the bracket assembly and a post shown in dashed lines.

FIG. 28 is a side view of the post mount bracket assembly of FIG. 27.

FIG. 29 is a top view of the post mount bracket assembly of FIG. 28.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
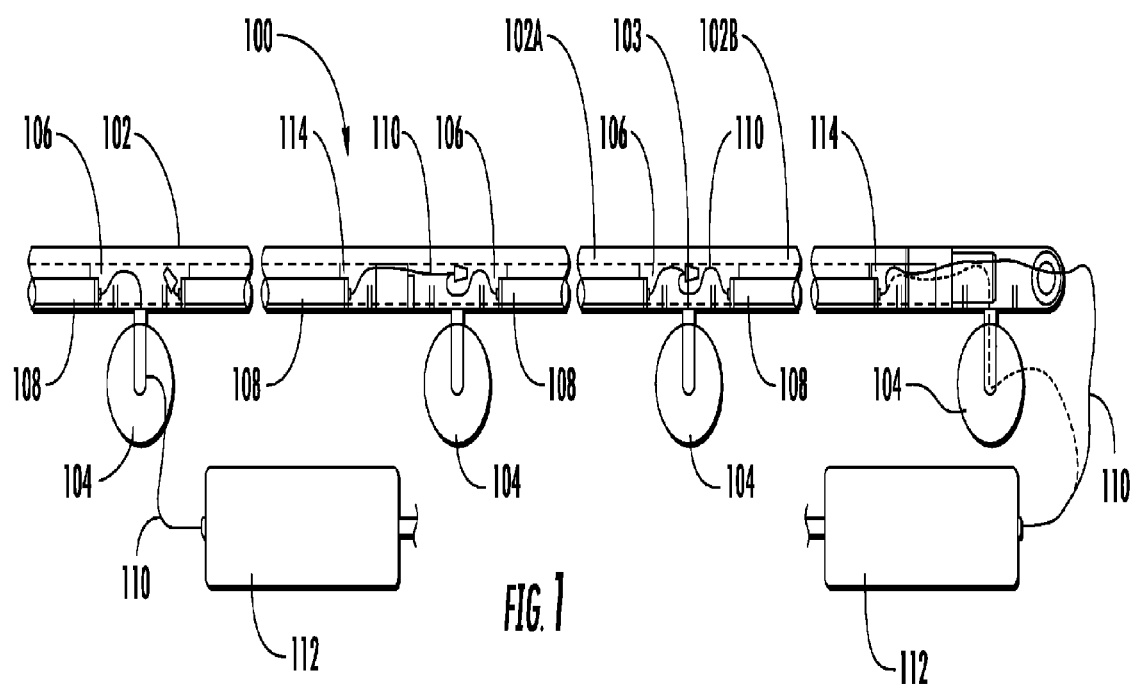
FIG. 1 is a side view of a railing system according to the present disclosure with elements mounted within the railing visible.

Referring now to FIG. 1, a railing system 100 includes a cap rail 102 and a plurality of mounting bracket assemblies such as wall mounting bracket assemblies 104. Mounting bracket assemblies 104 may be connected to cap rail 102 by an expansion bracket 106 received within a lower opening slot (described further below) of cap rail 102. Railing system 100 may include a plurality of light assemblies or fixtures 108 which are engaged by the expansion brackets within the cap rail and held in the slot of the cap rail by expansion brackets 106. Where the spacing of expansion brackets 106 (and of bracket assemblies 104) does not correspond to the length of light fixtures 108 installed within cap rail 102, a smaller expansion bracket 114 may be placed within the slot to hold and retain light fixtures 108.

Each of the expansion brackets 106 and 114 defines a cable way permitting wires 110 to be run through an interior of cap rail 102 to supply electrical power to each light fixture 108. Light fixtures may be powered by AC or DC current and may operate at a variety of different voltages within the scope of the present disclosure. One preferred but non-limiting embodiment shown herein includes light fixtures 108 configured with LED lighting elements driven by DC current at about 24 volts. These lighting fixtures are provided with power through wires 110 from one or more power supplies 112. As DC circuits require both a power and a return line to operate, wires 110 provide for a termination and a return line connected back to power supply 112 to drive the lighting elements within light fixtures 108. The power supplies may be connected to one or more light fixtures 108 in series or in parallel and wires 110 may be routed through mounting bracket assemblies 104 or through an end cap rail 102. Other power supplies or light fixtures may only require a single wire and the illustration of FIG. 1 is not intended to limit any of the known or foreseeable combinations of wiring and power supplies that might be used within a railing system according to the present disclosure.

Wall mount assemblies 104 may be used to mount system 100 to a wall and position to system 100 to serve as a hand rail, for example. In other installations, the rail system may be used to provide lighting, whether direct or indirect, for situations where a structural railing is not required but a secure and durable lighting mount is desired.

Referring now to FIG. 2, mounting bracket assembly 104 also includes a wall plate 116 configured to be mounted flush against a generally planar wall. A cover 118 may be provided which fits about plate 116 and shields fasteners connecting plate 116 to the wall from view and access. A hollow support 120 may extend from plate 116 to expansion bracket 106 and may include a hollow core 122 to permit wires 110 to be passed through into slot 124 for connection to light fixtures 108.

Referring now also to FIG. 3, expansion bracket 106 is positioned within a slot 124 of cap rail 102. Slot 124 is defined by a pair of opposing side walls 128, generally parallel in the embodiment shown, and a transverse end wall 130. Transverse wall 130 is positioned opposite a generally continuous opening 132 providing access and entry into slot 124. Expansion bracket includes a pair of opposing side walls 134 connected along a lower edge by a lower wall 136. A tab 138 is included at either end of lower wall 136 extending beyond the side walls 134 to engage light fixtures 108. Extending through lower wall 136 and threadedly engaging lower wall 136 are a pair of expander bolts 126. An upper edge 140 of side walls 134 of expansion bracket 106 extends to rest adjacent both transverse wall 130 and side walls 128 of slot 124. Cable way 133 is defined through expansion bracket 106 between side walls 134 of expansion bracket 106 and between transverse wall 130 of slot 124 and a distal end 142 of expander bolts 126.

Referring now to FIGS. 4 to 6, expansion bracket 106 is shown removed from mounting bracket assembly 104. It is anticipated that expansion bracket 106 may also be included with other types of mounting bracket assemblies, such as but not limited to, mounting brackets for securing to a top of a post or other some other support extending upwards toward the rail system. An opening 144 is provided in lower wall 136 to aid in mounting expansion bracket 106 to some other assembly and to permit passage of wires 110 into cable way 133.

At a lower end of expander bolts 126 are hex recesses 146 for receiving and engaging a hex or Allen wrench to permit the expander bolt to be advanced into or retracted from threaded portion 148 of lower wall 136. It is anticipated that other engagement arrangements may be provided for expander bolts 126, such as but not limited to Phillips or flat screw driver recesses, TORX® driver recesses or other proprietary driver configurations.

Side walls 134 include an inward extending shoulder 150 with a sloping inner wall 152 to engage distal end 142 of expander bolt 126. As expander bolt 126 is rotated within threaded portion 148, distal end 142 will advance or withdraw from shoulder 150. As distal end 142 advances into engagement with shoulder 150, side walls 134 of expansion bracket 106 will be forced outward. When expansion bracket 106 is positioned within slot 124, the outward movement of side walls 134 will bring these side walls into engagement with side walls 128 of slot 124. This engagement secures expansion bracket 106 within slot 124 without the need for chemical or more permanent mechanical bonding, such as for example welding. This engagement may also be lessened by rotating and retracting expander bolt 126, which may permit rail system to be disassembled for repair or replacement of parts, or for removal of an entire rail. It is also anticipated that distal end 142 of expander bolt 126 may include a tapered or beveled outer edge, which may cooperate with sloping inner wall 152 or may reduce the need or desire to include such a sloping inner wall.

Upper edges 140 of side walls 134 are configured at a desired distance from lower wall 136 to position lower wall 134 with respect to opening 132 of slot 124. As tabs 138 of lower wall 136 engage and hold light fixtures 108 within slot 124, the positioning of lower wall 136 may also affect the positioning of light fixture 108 with respect to opening 132. Side walls 134 may also include an upper extension 154 to further engage light fixture 108 and prevent the light fixture from being displaced too far into slot 124. Upper extensions 154 and tab 138 may cooperate to form a light fixture receiving space 156 for receiving and engaging an end of light fixture 108, preferably specifically configured for that purpose, to ensure that light fixture 108 is held securely in a desired position within slot 124.

Referring now to FIG. 7, a second embodiment of a mounting bracket assembly 204 includes an expansion bracket 206 that is received within a slot 224 of a cap rail 202. These elements of a rail system are similarly configured to system 100 shown above with the exception that cap rail 202 is of a greater diameter than cap rail 102, slot 224 is deeper that slot 124 and expansion bracket 206 includes upper edges of side walls 234 which are offset further from lower wall 136.

Referring now to FIGS. 7 to 11, side walls 234 include upper extensions 254 which cooperate with tabs 138 to define light fixture receiving spaces 256 for receiving and engaging light fixtures 108 and positioning with slot 224. Even though slot 224 is deeper than slot 124 and upper edge 240 is further offset from lower wall 136 than is upper edge 140, by having spaces 256 and 156 similarly configured, the same light fixture 108 may be used in either of the cap rails and properly positioned with respect to opening 132, regardless of the size or configuration of cap rail or slot.

Figure 12:
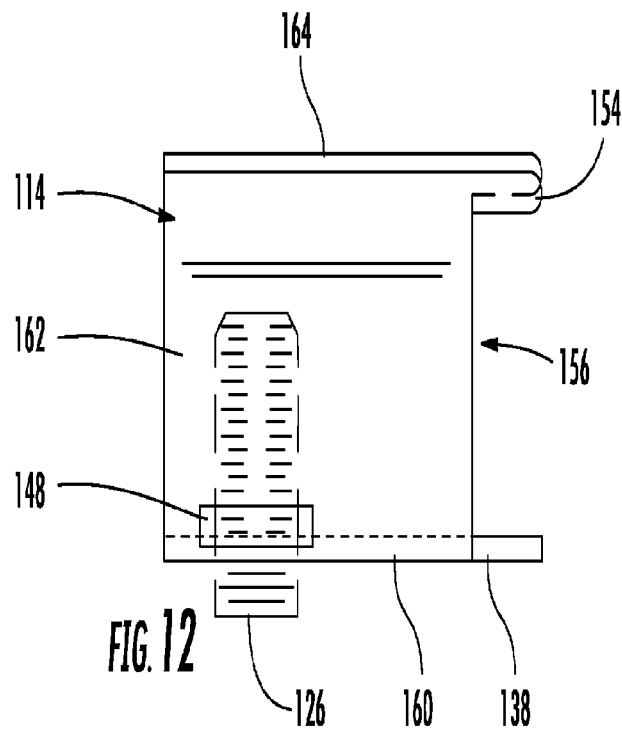
FIG. 12 is a side view of a mounting clip according to the present disclosure.
Figure 14:
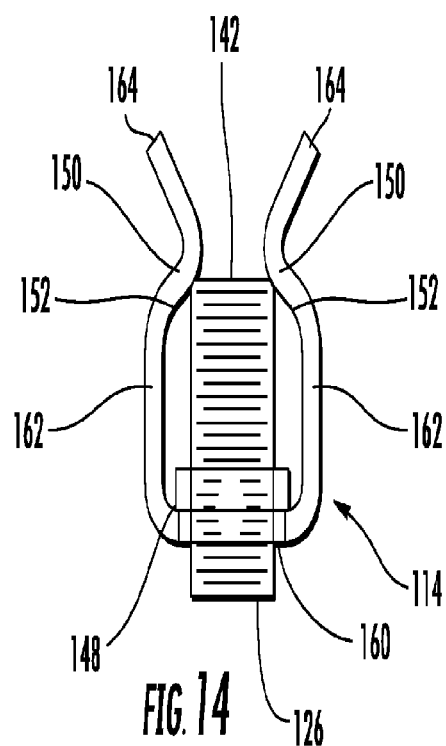
FIG. 14 is an end view of the mounting clip of FIG. 12.
Figure 13:
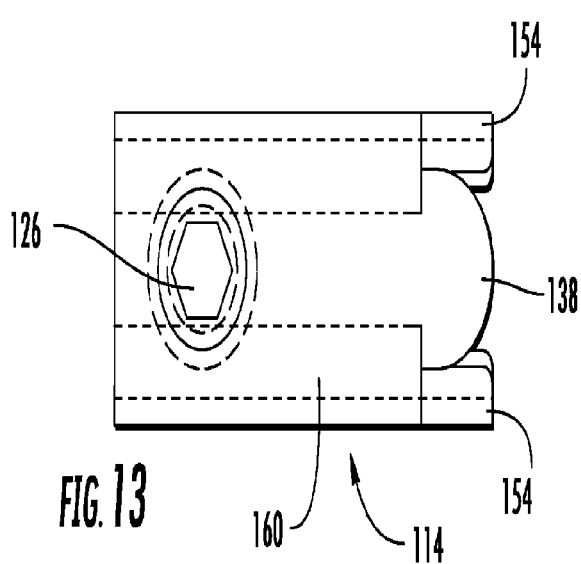
FIG. 13 is a bottom view of the mounting clip of FIG. 12.

Referring now to FIGS. 12 to 14, expansion bracket 114 includes a lower wall 160 and a pair of opposing side walls 162. Lower wall 160 includes tab 138 and side walls 162 include upper extension 154 which cooperate to define light fixture receiving space 156. Side walls 162 also include an upper edge 164 which is similarly spaced from lower wall 160 as is upper edge 140 from lower wall 136 of bracket 106. Thus, expansion bracket 114 is configured to be similarly received and positioned within slot 124 of cap rail 102. Further, space 156 of bracket 114 will similarly position light fixture 108 with slot 124 to the positioning of the same light fixture by space 156 of bracket 106. Side walls 162 also include shoulders 150 and sloping inner walls 152 to engage distal end 142 of expander bolt 126.

When positioned within slot 124 of cap rail 102, sidewalls 162, distal ends 142 of expander bolts 126 and transverse wall 130 of slot 124 cooperate to form a cable way similarly configured to cable way 133.

Referring now to FIGS. 15 to 17, a second embodiment of an expansion bracket 214 includes a lower wall 260 and a pair of opposing side walls 262. Lower wall 260 includes tab 138 and side walls 262 include upper extension 254 which cooperate to define light fixture receiving space 256. Side walls 262 also include an upper edge 264 which is similarly spaced from lower wall 260 as is upper edge 240 from lower wall 136 of bracket 206. Thus, expansion bracket 214 is configured to be similarly received and positioned within slot 224 of cap rail 202. Further, space 256 of bracket 114 will similarly position light fixture 108 with slot 224 to the positioning of the same light fixture by space 256 of bracket 206. Side walls 262 also include shoulders 150 and sloping inner walls 152 to engage distal end 142 of expander bolt 126.

When positioned within slot 224 of cap rail 202, sidewalls 262, distal ends 142 of expander bolts 126 and transverse wall 130 of slot 224 cooperate to form a cable way similarly configured to cable way 233.

Referring back to FIG. 1, showing the configuration of brackets 106 and 206 each with a pair of expander bolts 126, these brackets may be used to secure adjacent segments of cap rail 102. In FIG. 1, cap rail 102 includes at least two separate segments 102a and 102b which butt against each other at a join line 103. Join line 103 is positioned between expander bolts 126 of a bracket 106. By advancing the expander bolts of bracket 106 within slots 124 of each segment 102a and 102b, the two segments can be secured to the same bracket. Thus, for installations requiring a length of cap rail 102 that may be longer than can be produced or supplied as a unitary item, the length can be made up of a plurality of segments which are engaged and held together by brackets 106. Since brackets 106 (and 206) include cable ways, lights can be positioned within adjacent segments and wired together.

As referred to above, the hand rail system described herein can be mounted on one or more posts, as well as or in place of being secured to walls. Referring now to FIGS. 18 to 20, a post mount bracket assembly 304 includes a pair of expansion brackets 314 and a support 320 extending between the brackets 314 and a post engaging portion 316. Post engaging portion 316 is preferably configured and sized to fit within a post 300 that has been positioned where a hand rail is desired. A fastener 301 or other attachment means may be provided in post engaging portion 316 to ensure that the post and the post engaging portion are securely connected. Other means, including but not limited to adhesives or welding, in addition to mechanical fasteners, may be used to secure post engaging portion 316 to post 300.

Brackets 314 are configured similarly to brackets 114 and cooperate with transverse wall 130 of slot 134 of rail section 102 to define cable way 133. Brackets 314 include tabs 138 and extensions 154 to define space 156 for receiving and engaging fixtures and retaining fixtures within slot 134. Brackets 314 may be moveable with respect to each other about a vertical axis extending through support 320. Brackets 314 may be positioned at different angles with respect to each other, permitting rail sections 102 to extend in directions other than parallel to each other, as shown in FIG. 1. Post mount bracket assembly 304 may be used with brackets in line and parallel with each other or the brackets may be moved about the axis to allow rail sections 102 to extend in directions other than parallel to each other.

FIGS. 21 to 23 illustrate an alternative embodiment of a post mount bracket assembly 350. Post mount bracket assembly 350 is configured similarly to bracket assembly 304, with a pair of brackets 414 configured similarly to brackets 214, above. Brackets 414 are sized to fit within and engage slot 234 of rail section 202 and cooperate with transverse wall 130 of slot 234 to define cable way 233. Similarly to post mount bracket assembly 304, brackets 414 may be moved about a vertical axis of support 320 into a desired angular orientation, whether parallel to each other or not.

FIGS. 24 to 26 illustrate a post mount bracket assembly 360 with expansion bracket 106 mounted to support 320. The arrangement of post mount bracket assembly 360 is similar to that of wall mount bracket assembly 104, with a threaded fastener 362 provided to connect expansion bracket 106 to support 320 and extending through opening 144. FIGS. 27 to 29 illustrate a similarly configured post mount bracket assembly 370 with expansion bracket 206 mounted to support 320. It is anticipated that post mount bracket assemblies 360 and 370 may be adapted to permit angling of brackets 106 and 206, respectively, to permit mounting of rail sections to the brackets which are not horizontally situated. An example of such a pivoting arrangement might be used for installing a rail system including post mount bracket assemblies mounted to vertical posts and supporting a hand rail extending along a stair case or a ramp.

Figure 30:
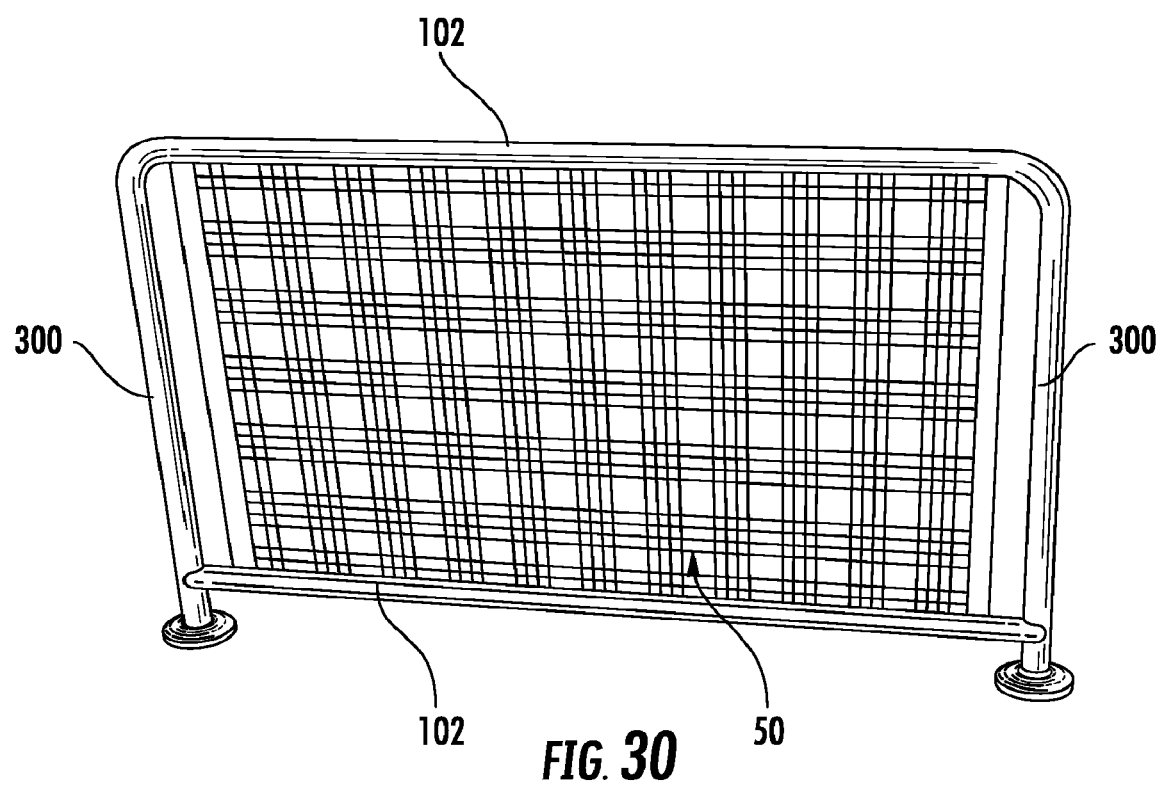
FIG. 30 is a perspective view of a rail system with upper and lower rails, spaced apart posts and an infill panel extending between the rails.

FIG. 30 illustrates an arrangement of a rail system according to the present disclosure which includes an upper rail section 102 and a lower rail section 102 with a pair of vertical posts spaced apart and extending between the rail sections. Lower rail section 102 is oriented with slot opening upwards. Positioned within the slots of rail sections 102 and extending between them is an insert panel 50. Insert panel 50 may be a purely decorative fixture or may provide a necessary closure of the gap between the spaced apart posts or rail sections. Alternatively, panel 50 could serve both an aesthetic and utilitarian role. Panel 50 is illustrated as a panel made of crossed wires or rods but may be made of a variety of interwoven linear elements, a plurality of parallel elements only, or may be made of a generally continuous material, such as glass or other materials. Expansion brackets such as the brackets disclosed herein may be used to secure the panels within the slots, with the panels including top and bottom sections sized to fit within the slots. The top and bottom sections of the panels may be configured to engage the tabs and extensions of the expansion brackets in a manner similar to the light fixtures.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A rail system comprising:
a cap rail with a slot formed in a surface of the cap rail, the slot defined by a pair of opposing side walls and a transverse wall extending between the side walls opposite a opening permitting access into the slot;
an expansion bracket positioned within the slot of the cap rail, the expansion bracket including at least one sidewall, and a base wall through which an expander bolt is threadedly received, the expander bolt urging the sidewall of the bracket outward against at least one of the side walls of the slot when advanced through the base wall, the base wall of the expansion bracket including a tab extending from at least one end of the bracket;
the expansion bracket defining a cable way within the slot between the side walls and between a distal end of the expander bolt and the transverse wall of the slot;
a fixture positioned within the slot adjacent to the expansion bracket, one end of the fixture engaging and retained within the slot by the tab of the expansion bracket;
wherein the fixture is a light fixture connected to a power source by a wire extending through the cable way of the expansion bracket.

2. The system of claim 1, wherein the expansion bracket is formed from a single piece of metal and includes two sidewalls, and each sidewall of the expansion bracket includes a shoulder formed by bending the sidewalls inward and the portion of the sidewalls above the shoulder are angled from an innermost projection of the shoulder outward to approximately a width defined by the sidewalls of the expansion bracket.

3. The system of claim 2, wherein the expander bolt includes an outer recess for receiving a tool to rotate the bolt in its threaded connection with the lower wall and rotation of the bolt advances the bolt against the shoulders of both side walls of the bracket to force the side walls of the bracket outward.

4. The system of claim 1, the expansion bracket further comprising a second expander bolt and a second tab extending from an end of the lower wall opposite the first tab.

5. The system of claim 4, further comprising a second fixture positioned within the slot on an opposite side of the expansion bracket, an end of the second fixture engaging and held within the slot by the second tab of the expansion bracket.

6. The system of claim 5, wherein the fixture and the second fixture are light fixtures and both light fixtures are connected to a power supply by a wire extending through the cable way.

7. The system of claim 5, further comprising a second expansion bracket positioned adjacent a second end of the fixture, the second expansion bracket having a tab for engaging and retaining a second end of the fixture within the slot, and a third expansion bracket positioned adjacent a second end of the second fixture, the third expansion bracket having a tab for engaging and retaining a second end of the second fixture within the slot.

8. The system of claim 4, further comprising a wall mount attached to the lower wall of the expansion bracket between the two expander bolts.

9. The system of claim 4, further comprising a post mount attached to the lower wall of the expansion bracket between the two expander bolts.

10. The system of claim 4, wherein the cap rail further comprises a first segment of cap rail and a second segment of cap rail defining a join line between the two segments, the join line being positioned along the bracket between the two expander bolts.

11. The system of claim 1, further comprising a second expansion bracket positioned adjacent a second end of the fixture, the second expansion bracket having a tab capable of engaging and retaining a second end of the fixture within the slot.

12. The system of claim 1, further comprising a pair of expansion brackets and the cap rail including a pair of segments, with each expansion bracket fitted within the slot of one of the cap rail segments.

13. The system of claim 12, wherein the expansion brackets are moveable with respect to each other and the cap rail segments are not aligned with each other.

14. A rail system comprising:
a cap rail with an upper surface and a lower surface and a slot formed in the lower surface, the slot defined by a pair of generally parallel side walls and an upper transverse wall extending between the side walls opposite a lower opening permitting access into the slot;
an expansion bracket sized to fit within the slot of the cap rail, the expansion bracket including a lower wall through which an expander bolt is threadedly received, a pair of opposing side walls extending from the lower wall, each side wall including a shoulder, the shoulders each intermediately positioned between the lower wall and an upper end of one of the side walls of the expansion bracket, the shoulder of each side wall engaging a distal end of the expander bolt;
the lower wall of the expansion bracket including a tab extending from at least one end of the bracket between the side walls,
the expansion bracket positioned within the slot of the cap rail, with the side walls of the expansion bracket opposite the lower wall each positioned adjacent one of the side walls of the slot and the lower wall of the expansion bracket extending between the side walls of the slot and closing of a portion of the slot, the upper end of each of the side walls of the expansion bracket extending adjacent to a junction between one of the side walls and the transverse wall of the slot;
wherein advancing the distal end of the expander bolt away from the lower wall forces the shoulders outward from each other, pressing at least a portion of the side walls of the expansion bracket into engagement with the side walls of the slot, with the expansion bracket defining a cable way between the shoulders and the distal end of the expander bolt, the transverse wall of the slot and a portion of the side walls of the expansion bracket; and a fixture positioned within the slot adjacent to the expansion bracket, one end of the fixture engaging and retained within the slot by the tab of the lower wall of the expansion bracket;

wherein the fixture is a light fixture connected to a power source by a wire extending through the cable way of the expansion bracket.

* * * * *